(No Model.)

H. WYMAN.
CLUTCH.

No. 495,540. Patented Apr. 18, 1893.

Witnesses.
Fred N. Ashworth
John F. C. Prinkert

Inventor.
Horace Wyman
by Crosby & Gregory
Attys.

UNITED STATES PATENT OFFICE.

HORACE WYMAN, OF WORCESTER, MASSACHUSETTS, ASSIGNOR TO THE CROMPTON LOOM WORKS, OF SAME PLACE.

CLUTCH.

SPECIFICATION forming part of Letters Patent No. 495,540, dated April 18, 1893.

Application filed May 20, 1892. Serial No. 433,667. (No model.)

*To all whom it may concern:*

Be it known that I, HORACE WYMAN, of Worcester, county of Worcester, State of Massachusetts, have invented an Improvement in Clutch-Pulleys, of which the following description, in connection with the accompanying drawings, is a specification, like letters and figures on the drawings representing like parts.

This invention has for its object the production of an improved clutch pulley adapted for use in connection with looms and other machinery.

My invention relates more especially to the construction of a loose pulley and the devices for sliding it laterally on the shaft to engage it with or disconnect it from the part of the clutch pulley fast on the shaft to be rotated.

Figure 1:
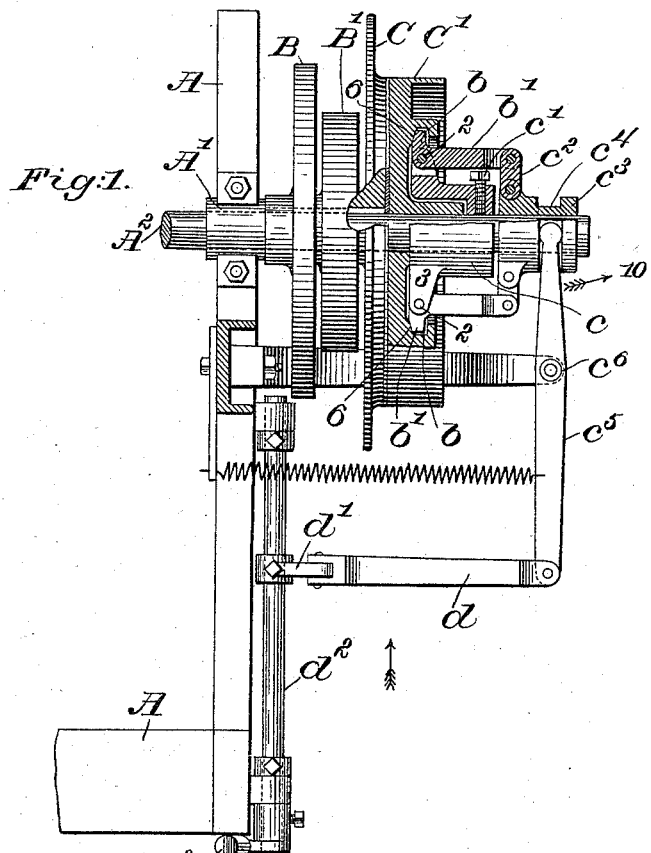
Figure 2:
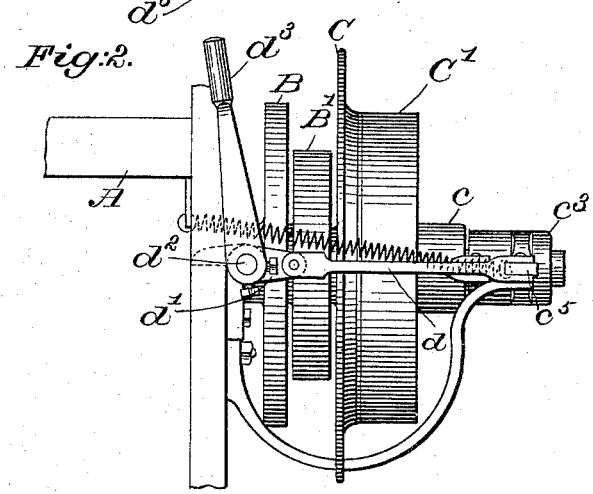

Figure 1, in plan view partially broken out, shows a clutch pulley embodying my invention; and Fig. 2, an elevation looking at Fig. 1 in the direction of the arrow thereon.

The frame-work A is and may be of any usual or suitable shape. This frame-work has suitable bearings $A'$ for the shaft $A^2$ to be rotated. The shaft $A^2$ is herein shown as provided with a brake pulley B and a toothed gear $B'$, and alongside the said gear, and fast with relation to it and the said shaft, is one-half, C, of a clutch or friction pulley, the other half, $C'$, being loose on the said shaft. Between the contiguous faces of the clutch or friction pulley parts, I place preferably a friction washer or disk $a$ of leather or other suitable material. The loose pulley $C'$ is so shaped as to leave at its outer side an annular pocket $b$, in which plays the inner ends of one or more dogs or levers $b'$, pivoted at 2 on ears 3 of a hub $c$ made fast on the shaft $A^2$ by a suitable set screw $c'$, the said hub as herein shown, being hollow to receive the hub of the loose pulley as shown in Fig. 1. The levers $b'$ are shown as of elbow shape, and their long arms are jointed by short links $c^2$ to a collar $c^3$ mounted loosely on the shaft $A^2$, and having an annular groove $c^4$ into which enters loosely a suitable projection at the inner end of a shipper lever $c^5$ shown as pivoted at $c^6$. This lever as herein represented is jointed by a link $d$ to an arm $d'$ of a rock shaft $d^2$ in suitable bearings on the frame, said rock shaft having a suitable handle $d^3$ by which to move the collar $c^3$ longitudinally on the shaft $A^2$ when it is desired to clutch or to unclutch the pulleys.

The drawings show the clutch pulleys in engagement, the hand lever being turned fully to the left thus sliding the collar $c^3$ to the left, the short arms of the levers or dogs $b'$ at such time acting against the sides 6 of the pocket or chamber $b$, and pushing the loose pulley $C'$ to the left against the pulley C; but by turning the hand lever over to the right from the position Fig. 2, the collar $c^3$ will be drawn to the right, turning the levers or dogs $b'$ so that their inner ends strike against the overhanging or outer flange of the pocket, thus pulling the loose pulley part $C'$ away from the fast pulley part C.

The driving belt, which in practice will always rest on the loose pulley $C'$, may be driven from any usual counter shaft.

This invention is not limited to the exact shape shown for the friction faces of the clutch pulleys, or to the shape shown for the pocket or recess at the outer face of the loose pulley, or to the exact shape of the dogs or levers $b'$ and their actuating devices.

Having described my invention, what I claim, and desire to secure by Letters Patent, is—

A shaft to be rotated; a friction clutch pulley part fast thereon; and a co-operating loose pulley part longitudinally movable and rotatable on the said shaft and provided with an annular pocket or recess, combined with a dog or lever having one end located in said pocket or recess and pivotally supported on the shaft, and with devices including a sliding collar and connecting link for moving said dog or lever to cause it when turned in one direction to force the two parts of the clutch pulley firmly together, and in the other direction to effect the frictional disengagement of said pulley parts to thus leave the said shaft at rest, substantially as described.

In testimony whereof I have signed my name to this specification in the presence of two subscribing witnesses.

HORACE WYMAN.

Witnesses:
GEO. W. GREGORY,
E. JOSEPHINE BENNETT.